Sept. 23, 1969  G. A. TINNERMAN  3,468,212
COMPOSITE FASTENER
Filed May 13, 1966
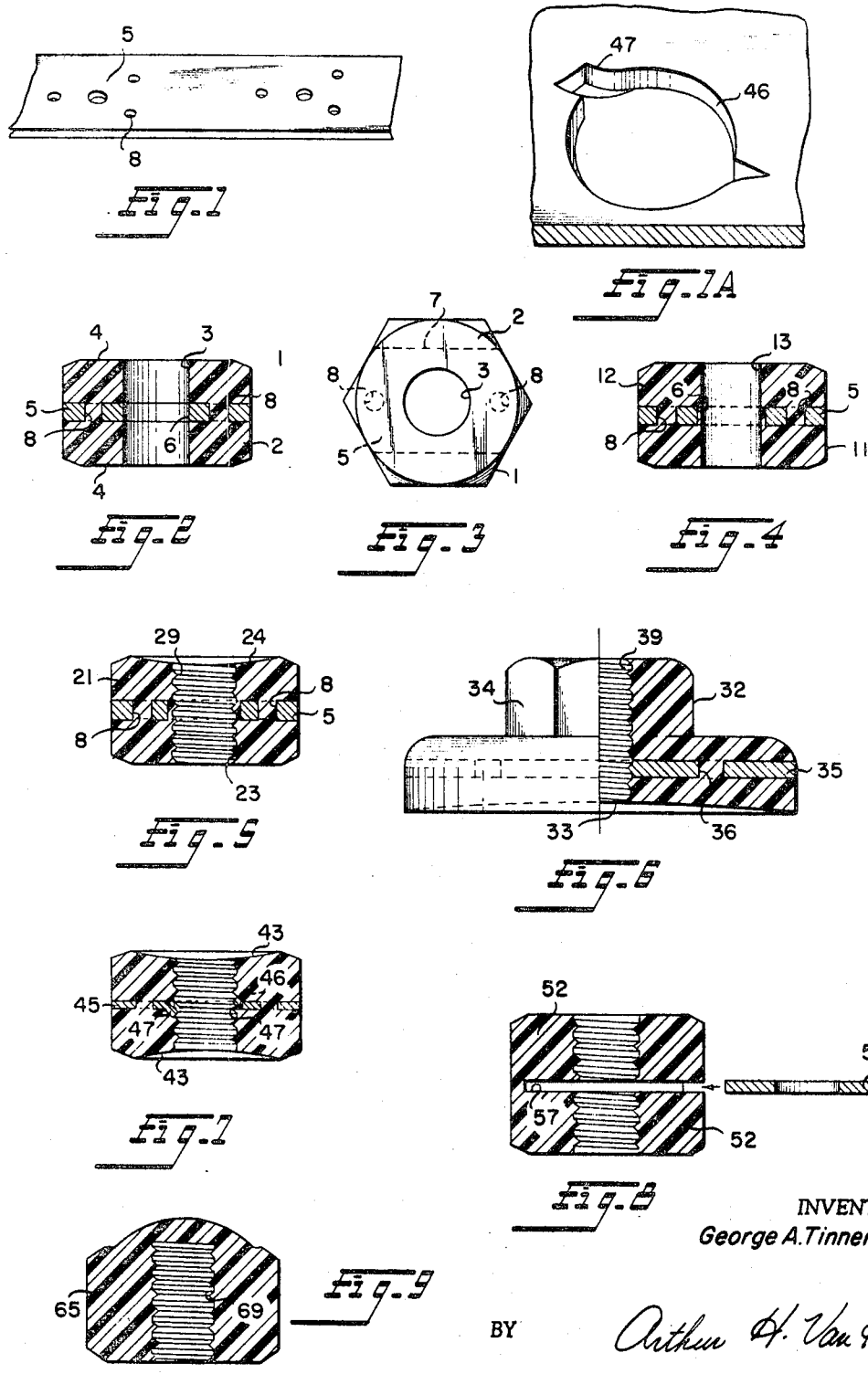
INVENTOR
George A. Tinnerman
BY Arthur H. Van Horn
ATTORNEY United States Patent Office 3,468,212
Patented Sept. 23, 1969

3,468,212
COMPOSITE FASTENER
George A. Tinnerman, 17864 Beach Road,
Lakewood, Ohio 44107
Continuation-in-part of applications Ser. No. 591,244,
June 13, 1956, Ser. No. 8,546, Feb. 15, 1960, and Ser.
No. 387,261, July 17, 1964. This application May 13,
1966, Ser. No. 549,880
Int. Cl. F16b 37/02, 27/00, 39/24
U.S. Cl. 85—32                                        8 Claims This invention relates to fasteners and more particularly to a fastener which will function as a sheet metal nut, lock nut and seal, is economical to manufacture and is peculiarly adapted to mass production industries. This application is a continuation-in-part of my application Ser. No. 591,244, filed June 13, 1956, now abandoned, and my continuation-in-part application Ser. No. 8,546, filed Feb. 15, 1960, now abandoned, and my continuation-in-part Ser. No. 387,261, filed July 17, 1964, now abandoned.

Sheet metal nuts are widely used in the automotive and appliance industries to form a fastening means which will be secure and which will lock the fastening as against vibration and the like. Such fasteners are made from steel which after formation of the fastener must be hardened to impart spring steel characteristics. Moreover, an ever increasing portion of the fasteners employed in the automotive and appliance industries are required to incorporate sealing compounds. In same cases, fasteners made out of mild steel are employed which, therefore, do not require the additional step of hardening. However, as is well known by users of this form of fastener, they become readily loosened by vibration and operational movement and frequently must be combined with auxiliary locking means.

Another problem arises in mass production, as the threaded fasteners must be tightened by wrenches set to produce the force required to secure adequate security for the fastener. The torque wrench is set for this required force for the type of fastener employed. Fasteners which cannot be tightened under such force may not be used because of the inconvenience of readjusting or substituing the wrenches, or are endangered by the possibility of using a wrench which will destroy the fastener under excessive force.

The present invention avoids these general disadvantages of the prior art by providing economically a low cost fastener which has locking, sealing, insulating and isolating functions inherent in the unit produced and which lends itself to automatic production operations. This unit is produced as a completely finished article which requires no finishing, heat treating or coating. The slightly greater cost compared with the less advantageous mild steel fastener, is more than offset by the costly handling of the latter, including steps of heat treating, finishing, and coating; and it has the advantages over the spring steel fastener of a more secure lock, of sealing, insulating, and isolating characteristics, and a higher torque resistance to tightening by automatic tools.

According to my invention the fastener is a composite unit formed of a plastic nut body of essentially rigid but relatively yieldable molded plastic material combined with a thin sheet metal nut element incorporated in the plastic nut body, both elements functioning to receive and engage the threads of a threaded member threaded into the fastener. The plastic nut body may be similar in composition to known plastic nuts and may be engaged by a wrench and tightened in the usual manner.

These plastic nuts are suitable for light fasteners, but have only small resistance to torque. The sheet metal element incorporated in the molded plastic nut body may be of mild untreated steel or other metal and provides additional resistance to the force exerted between the threaded member and the fastener unit.

The body is preferably formed from a plastic material which is classed as rigid or semi-rigid, and is stressed to such an extent that the base portion of the nut may become rigid as torque is applied to the nut. The rigidity thus imparted to the unhardened thin sheet nut metal element is sufficient to prevent deformation of this element upon application of normal tightening torque. The metallic element may be initially coated or finished so that coating or finishing operations are not required after the unit is formed. However, coating of the metal element will not be required where the metal element is entirely surrounded by the body.

Since the introduction of the polymers commonly known as plastics, many fasteners including nuts have been made from the rigid or semi-rigid types of plastic materials. Any of the rigid or semi-rigid plastic materials now used for fasteners may be employed, or others of the same type which are found to be suitable. The polyvinyls such as polyvinyl chloride or vinyl-chloride-acetate are examples and are described in "Concise Guide to Plastics," Herbert R. Simonds, pp. 74–81, Reinhold Publishing Corporation, New York, 1957. Other plastics such as polyhexamethylene adipamide, and the polyamides such as nylon, and polystyrene and polyethylene, may also be used instead of those noted above. The rigid and semi-rigid materials as described above have been denoted in this application as "essentially rigid" to express the characteristics of the plastic materials which have the necessary strength and firmness for fasteners, although slightly yieldable as compared with metal.

This plastic nut body is enough softer than a metal stud that it may be directly threaded on the threads of the stud without prior formation of threads, the metal stud serving to cut the threads. It has been found, however, that the formation of partial threads, as by threads of the proper peak diameter and pitch but only half as deep, will enable the plastic nut body to engage the threads on the stud more easily and serve as a guide for the threads. At the same time, the metal stud will complete the cutting of the threads, will compact the plastic material and provide a more secure fastener and a better seal.

Other objects and advantages of the invention will be apparent from the descriptions and illustrations of the embodiments which are set forth in this specification and the accompanying drawings.

In the drawings:

FIGURE 1 is a thin, sheet metal strip from which a nut element is formed.

FIGURE 1A illustrates a modification of the formation of the nut element of FIGURE 1.

FIGURE 2 is a cross section of one form of composite fastener.

FIGURE 3 is a plan view of the fastener of FIGURE 2.

FIGURE 4 is a cross section of a modified form of fastener.

FIGURE 5 is a cross section of a further modification.

FIGURE 6 is another modification, showing the composite fastener partially in elevation and partially in cross section.

FIGURE 7 is a cross section of a fastener with the nut element formed according to FIGURE 1A.

FIGURE 8 is an exploded view of a nut body and nut element to be assembled into a composite fastener.

FIGURE 9 is a cross section of a plastic nut.

A fastener 1 according to this invention is shown in FIGURES 2 and 3, in which a plastic nut body 2 has an opening 3 therethrough, with the opposite end faces 4 transverse to said opening. This plastic nut body is polygonal for engagement by a wrench and is threaded on a threaded member by rotation of the nut body to cut the threads in the plastic material as the nut body threads on the threaded member. This nut body, like plastic nuts now known, is suitable only for a light fastener requiring little strength and provides low resistance to turning by a wrench.

To improve the strength of engagement with a threaded stud, a thin sheet metal nut element 5 is incorporated in the plastic nut body 2. This thin sheet metal element has an opening 6 aligned with the opening 3 in the nut body, so that the threads of the threaded element engage the edge of the opening in the thin metal element in a manner similar to certain known threadless nuts.

The nut element 5 may be molded in the plastic nut body 2 as shown in the drawings, the nut body 2 extending beyond the sides 7 of the metal element as shown in FIGURE 3, and engaging the sides to prevent relative rotation. The metal element also has apertures 8 through which the plastic extends, so that the plastic material forms a complete nut body with a metal element therein. This metal element may extend to the periphery of the nut body at its ends and may conform to the polygonal periphery of the nut body for engagement by a wrench.

The composite fastener 11 shown in FIGURE 4 is similar to that in FIGURE 2, except that the plastic nut body 12 has the opening 13 formed smaller than the opening 6 in the metal element 5. The threads formed by the threaded element in the opening 13 may be cut deeper with the same engagement between the threads of the stud and the opening 6 in metal element 5.

The plastic nut body 21 of the composite fastener is modified in the form shown in FIGURE 5 by the provision of partial threads 29 in the opening 23 having the same peak diameter and pitch for engagement with the threaded element, but of substantially less depth than the threads on the threaded element. These partially formed threads guide the nut body on the stud and assure engagement with the threads of the stud. At the same time, as the nut body is threaded on the stud, the threads in the plastic nut body are cut to conform to the threads on the stud and the plastic material is compressed as the nut body is tightened. By partially forming threads on the nut body, the complete threads are more easily cut and the compressed material provides a stronger engagement. The end faces are also slightly concave at 24, and may be flattened as the fastener with the nut element 5 is screwed down, increasing the locking effect of the slightly yieldable material and providing a stronger seal.

A composite fastener having a broader base is shown in FIGURE 6, the plastic nut body 32 having a polygonal portion 34 for engagement by a wrench, and a larger skirt portion having a slightly concave base 33. This large base is especially effective in securing the nut against loosening and in sealing, as well as providing a large area of engagement for certain types of articles to be fastened. The thin metal nut element 35 has openings 36 through which the integral plastic nut body extends and may be narrower than the nut body as in the other forms of the fastener. The partial threads 39 have the advantages of those in the fastener of FIGURE 5.

The metal element 45 may be modified as shown in FIGURE 7 by the formation of teeth on projections 47 on the periphery of the opening 46 for engagement of the threads of the stud. As shown in FIGURES 1A and 7, each projection 47 is shown as struck out of the thin metal on the periphery of the opening and projected a distance less than the pitch of the threads, so that the threads on a stud will more easily engage the nut element. Any number of the projections 47 may be used, and only one projection is sufficient in many fasteners to assure effective engagement by the threads of the threaded element. The nut body in this form also has concave end faces 43 similar to the nut body in FIGURE 5.

It is possible to form the fasteners very simply with automatic machinery by forming the nut bodies and the metal nut elements separately, and assembling them into a composite fastener. The complete plastic nut body 52 is molded as a separate body as shown in FIGURE 8, a slot 57 providing for assembly of the metal nut element 55 in the nut body. The close contact of the surfaces of the nut body and nut element provides close cooperation of the nut body and nut element, while the partially cut threads in the nut body assure the most effective engagement with a threaded element. The element 55 is similar to the element 5 in FIGURE 3, except that apertures 8 are not necessary. The sides of element 55 will engage the sides of the slot 57 to prevent relative rotation of the nut body and metal element.

The partial formation of threads in a plastic nut body has been found to improve the operation and utility of an all-plastic nut, which is illustrated in FIGURE 9. The nut body 65 constitutes the nut and differs from known plastic nuts by the formation of partial threads 69 to engage a threaded stud. As in the nut body of a composite fastener, the threads are of correct peak diameter and pitch to engage the standard threads of a stud, but are of substantially less depth, so that the complete threads are formed by the threaded stud as the plastic nut is threaded on the stud. The cutting of the complete threads by the stud as the nut rotates assures a tight engagement between the threads, and close tolerances of the threads in the nut are not required. As the nut is tightened, the plastic material is compressed and the stresses distributed uniformly to provide greater security and holding power than if the threads were formed to accommodate the complete threads of the stud.

The metal nut elements may be formed from a strip of thin sheet metal such as mild steel. This material is thin enough to engage between the threads of the engaging threaded member. This strip, as shown in FIGURE 1, is punched or drilled to form an opening 5 and a plurality of apertures 8 for each nut element, and then is severed to form the separate elements. As shown in FIGURE 1A, the stud receiving opening 45 may have one or more projections struck up for the periphery to engage the threads of the stud and serve as a guide for the threads.

The composite fastener of this invention combines the effect of an essentially rigid plastic nut with the harder thread engaging metal element. The metal element in one example was made of .017 inch material for use with a 9⁄32 inch stud and as a separate fastener had only sufficient strength for a very light fastener. But when this thin metal nut element is incorporated in a plastic nut body, the nut element is maintained in engagement with the threads of the threaded member under much greater force. At the same time, the metal element exerts compressive force on the plastic nut body to compact and constrict the material surrounding the threaded opening to increase the gripping engagement of the plastic nut body on the threaded member. As a result, the composite fastener will resist a much greater force and will be much stronger when tightened than the total resistance of the individual separated components. This composite fastener is inherently secure against loosening by vibration due to the resilience of the essentially rigid plastic material and provides its own sealing and insulation, and is compatible in torque resistance with other threaded fasteners to which torque wrenches are applied. The feature of partially forming the threads in the plastic nut body by cutting by the threaded stud simplifies manufacture and application of the nut body, and provides a stronger and more secure fastener.

The specific examples of the invention described are intended to illustrate the invention, which contemplates various modifications.

I claim:

1. A composite fastener comprising a nut body of essentially rigid synthetic resinous plastic material having an opening therethrough for threaded engagement with a threaded member to constitute a threaded fastening means and having flat surfaces for tool engagement and opposite end faces transverse to the axis of said opening, in combination with a thin sheet metal nut element molded in said nut body extending transversely of said opening and spaced substantially greater distances from said opposite end faces than the thickness of said element, said element having an opening at least as large and axially aligned with the opening in said nut body for engagement with the threaded member, the area of said sheet metal element being substantially less than the cross sectional area of of said nut body and said metal element having apertures therethrough spaced from said opening so that portions of said nut body on opposite sides of said sheet metal element are connected through said apertures and on the sides of said metal element to form said nut body and engage said metal element to prevent relative rotation, said composite fastener being symmetrical about a transverse median plane, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threaded member, so as to increase the resistance of said fastener to the torque produced on relative rotation to tighten said fastener on the threaded member.

2. A composite fastener comprising a nut body of essentially rigid synthetic resinous pastic material having an opening therein for threaded engagement with a threaded member to constitute a threaded fastening means for having opposite end faces transverse to the axis of said opening, in combination with a thin sheet metal nut element extending transversely of said opening for engagement with the threaded member molded in said nut body and spaced substantially greater distances from said opposite end faces than the thickness of said element and having an opening axially aligned with the opening in said nut body, the opening in said nut body on one side of said metal element being of smaller diameter than the opening in said metal element by less than the depth of the threads on the threaded member, the area of said sheet metal element being substantially less than the cross sectional area of said nut body and said metal element having apertures therethrough spaced from said opening so that portions of said nut body on opposite sides of said sheet metal element are connected through said apertures and on the sides of the said metal element to form said nut body and engage said metal element to prevent relative rotation, said element extending to the outer perimeter of said nut body on opposite sides, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threads member, so as to increase the resistance of said fastener to the torque produced on relative rotation to tighten said fastener on the threaded member.

3. A composite fastener comprising a nut body of essentially rigid synthetic resinous plastic material having an opening therein for threaded engagement with a threaded member to constitute a threaded fastening means and having opposite end faces transverse to the axis of said opening, in combination with a thin sheet metal nut element incorporated in said nut body extending transversely of said opening and spaced substantially greater distances from said opposite end faces than the thickness of said element and having an area substantially less than the cross sectional area of said nut body and engaging said nut body to prevent relative rotation, said element having an opening axially aligned with the opening in said nut body for engagement with the threaded member, the periphery of said opening in said metal element having a total circular arcuate length of greater than 270° to engage the threads of said threaded member at points spaced less than 90° and exert pressure on said metal element at diametrically spaced points on opposite sides, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threaded member, so as to increase the resistance of said fastener to the torque produced on relative rotation to tighten said fastener on the threaded member.

4. A composite fastener comprising a nut body of essentially rigid synthetic resinous plastic material having an opening therein for threaded engagement with a threaded member to constitute a threaded fastening means and having opposite end faces transverse to the axis of said opening, in combination with a thin sheet metal nut element incorporated in said nut body extending transversely of said opening and spaced substantially greater distances from said opposite end faces than the thickness of said element and having an area substantially less than the cross sectional area of said nut body and engaging said nut body to prevent relative rotation, said element having an opening axially aligned with the opening in said nut body for engagement with the threaded member, the periphery of said opening in said metal element having a circular arcuate length of substantially 360° to engage the threads of said threaded member through one complete turn, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threaded member, so as to increase the resistance of said fastener to the torque produced on relative rotation to tighten said fastener on the threaded member.

5. A composite fastener comprising a nut body of essentially rigid synthetic resinous plastic material having an opening therein for threaded engagement with a threaded member to constitute a threaded fastening means, and having opposite end faces transverse to the axis of said opening, said opening having partial threads formed therein of a peak diameter and pitch to engage said threaded member but of substantially less depth than the complete threads, in combination with a thin sheet metal nut element incorporated in said nut body and spaced substantially greater distances from said opposite end faces than the thickness of said element and having an opening axially aligned with the opening in said nut body, the partial threads in said nut body guiding and assuring proper engagement of the nut body and metal element with said threaded member, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threaded member, so as to increase the resistance of said fastener to the torque produced on relative rotation to tighten said fastener on the threaded member.

6. A fastener as defined in claim 5, in which the diameter of said opening in said metal element is greater than the peak diameter of said partial threads but less than the root diameter of the threads cut by said threaded member.

7. A fastener as defined in claim 5, in which the diameter of the opening in said metal element is substantially as great as the diameter of the base of said partial threads.

8. A composite fastener comprising a plastic nut body of essentially rigid synthetic resinous plastic material having an opening therein and end faces transverse to the axis of said opening to form a threaded fastener upon engagement by a threaded member, in combination with a thin sheet metal nut element incorporated in said nut body between said end faces and with an opening therethrough axially aligned with the opening in said nut body, said nut element being of substantially smaller cross sectional area than said nut body and spaced from said end faces substantially greater distances than the maximum axial dimension of said element and confined in said nut body against relative rotation and with its faces in close contact with said nut body, the maximum axial dimension of said nut element at any point not exceeding the pitch distance of a threaded fastener in engagement with said composite fastener and the distance between either of said end faces and said metal nut element being equal to a plurality of turns of the threads of said threaded member, said plastic nut body in contact with the faces of said sheet metal nut element limiting distortion of said sheet metal nut element to maintain said sheet metal nut element in engagement with the threads of said threaded member and said metal nut element exerting compressive force on said plastic nut body to increase the engagement between said plastic nut body and the threads of the threaded member, so as to increase the resistance of said fastener to the torque produced on relative rotation to tighten said fastener on the threaded member.

References Cited

UNITED STATES PATENTS

| | | |
|---|---|---|
| 977,710 | 12/1910 | Craig. |
| 1,696,876 | 12/1928 | Bacon _____ 85—35 |
| 2,072,426 | 3/1937 | Kraft. |
| 2,150,194 | 3/1939 | Thanas _____ 151—7 |
| 2,417,263 | 3/1947 | Morehouse _____ 85—36 |
| 2,756,795 | 7/1956 | Clevgnar. |
| 2,884,100 | 4/1959 | McKee. |
| 2,904,820 | 9/1959 | Flora _____ 85—36 |
| 3,030,997 | 4/1962 | Collins _____ 151—7 |

FOREIGN PATENTS

| | | |
|---|---|---|
| 167,233 | 11/1950 | Austria. |
| 539,214 | 4/1957 | Canada. |
| 1,275,038 | 9/1961 | France. |
| 567,862 | 3/1945 | Great Britain. |

MARION PARSONS, Jr., Primary Examiner

U.S. Cl. X.R.

151—7